United States Patent [19]

Liou

[11] Patent Number: 5,481,783
[45] Date of Patent: Jan. 9, 1996

[54] ATTACHMENT DEVICE FOR GEARSHIFT LOCK

[76] Inventor: Gaieter Liou, No. 48, Ton Hwa St., San-Min Dist., Kaohsiung, Taiwan

[21] Appl. No.: 267,375

[22] Filed: Jun. 29, 1994

[51] Int. Cl.[6] .................................................. E05D 7/10
[52] U.S. Cl. .................. 16/264; 16/266; 16/DIG. 43; 70/247; 248/551
[58] Field of Search ............... 16/264, 266, 221, 16/229, 230, 231, 268, 380, 387, 392, DIG. 43; 70/245, 246, 247, 248, 203; 248/551

[56] References Cited

U.S. PATENT DOCUMENTS

| 1,423,955 | 7/1922 | Miller | 70/203 |
|---|---|---|---|
| 1,494,717 | 5/1924 | Sell | 70/203 |
| 2,677,147 | 5/1954 | Phillips | 16/266 |
| 4,334,338 | 6/1982 | Conn | 16/266 |
| 4,584,739 | 4/1986 | Konen | 16/266 |
| 4,679,417 | 7/1987 | Van Cise, Jr. | 70/247 |
| 4,693,099 | 9/1987 | Cykman | 70/247 |
| 5,295,375 | 3/1994 | Jonas | 70/203 |

Primary Examiner—P. Austin Bradley
Assistant Examiner—Chuck Y. Mah
Attorney, Agent, or Firm—Jacobson, Price, Holman & Stern

[57] ABSTRACT

An attachment device attaches a gearshift lock to a vehicle and includes a base plate fixed to the vehicle and a bar member for supporting the gearshift lock. The bar member includes a sleeve for rotatably engaging with a rod disposed on the base plate. A projection is extended from the rod for engaging with a notch of the sleeve so as to prevent the bar member from disengaging from the base plate. A screw may secure the sleeve to the rod so as to prevent the bar member from rotating relative to the base plate.

1 Claim, 3 Drawing Sheets

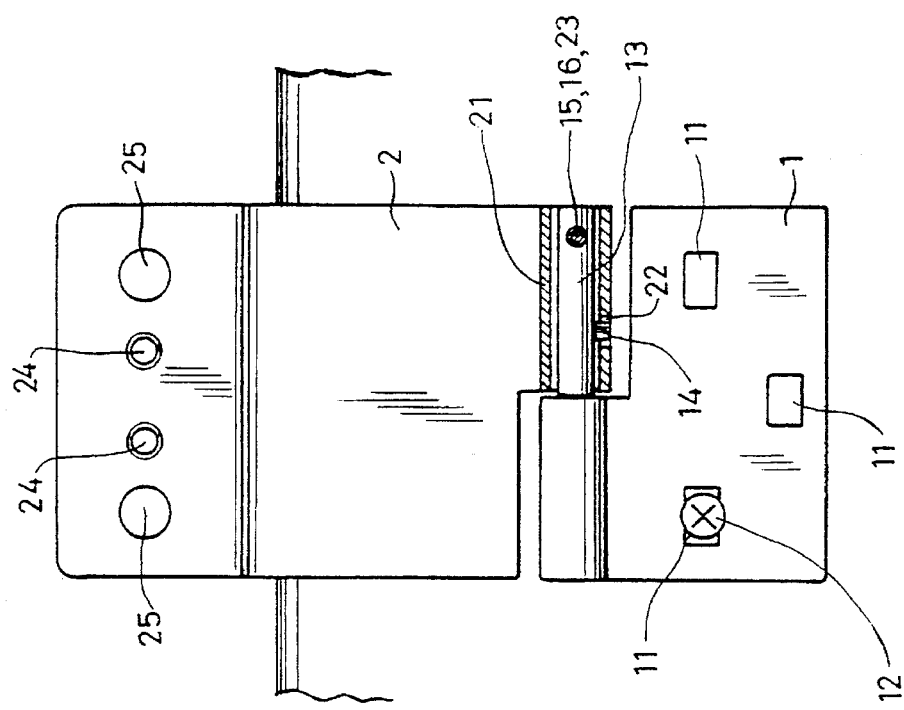
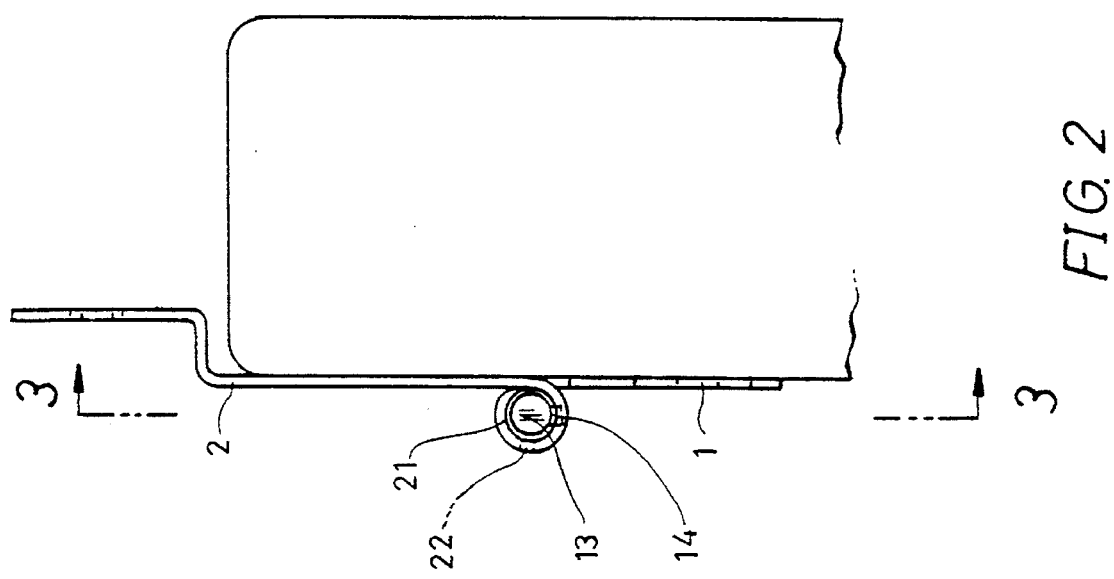

ATTACHMENT DEVICE FOR GEARSHIFT LOCK

BACKGROUND OF THE INVENTION

1. Field of the Invention

The present invention relates to an attachment device, and more particularly to an attachment device for attaching a gearshift lock to a vehicle.

2. Description of the Prior Art

A typical locking arrangement for the gearshift stick of vehicles is disclosed in U.S. Pat. No. 4,693,099 to Cykman, issued Sep. 15, 1987. In this patent, a lock device is attached to the profiled floor portion of a vehicle by a rigid bar. However, the gearshift mechanism is disposed in the profiled floor portion of the vehicle and the rigid bar is solidly secured to the floor portion such that the floor portion can not be easily disengaged or disassembled for repairing the gearshift mechanism when required. For anti-theft purposes, the rigid bar is solidly secured to the vehicle and can not be easily removed.

The present invention has arisen to mitigate and/or obviate the afore-described disadvantages of the conventional attachment device for gearshift locks.

SUMMARY OF THE INVENTION

The primary objective of the present invention is to provide an attachment device for attaching the gearshift lock to the vehicle, the device may be easily disassembled for disengaging the floor portion of the vehicle when required and may be solidly secured in place for locking the gearshift stick.

In accordance with one aspect of the invention, there is provided an attachment device for attaching a gearshift lock to a vehicle, the attachment device comprising a base plate fixed to the vehicle, the base plate including a rod provided thereon, the rod including a projection formed thereon, a bar means for supporting the gearshift lock, the bar means including a sleeve formed thereon for rotatably engaging with the rod, the sleeve including a notch formed therein for engaging with the projection, and means for securing the sleeve to the rod so as to prevent the bar means from rotating relative to the base plate.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a side elevational view of the attachment device;

FIG. 3 is a cross sectional view taken along lines 3—3 of FIG. 2; and

DETAILED DESCRIPTION OF THE PREFERRED EMBODIMENT

Figure 1:
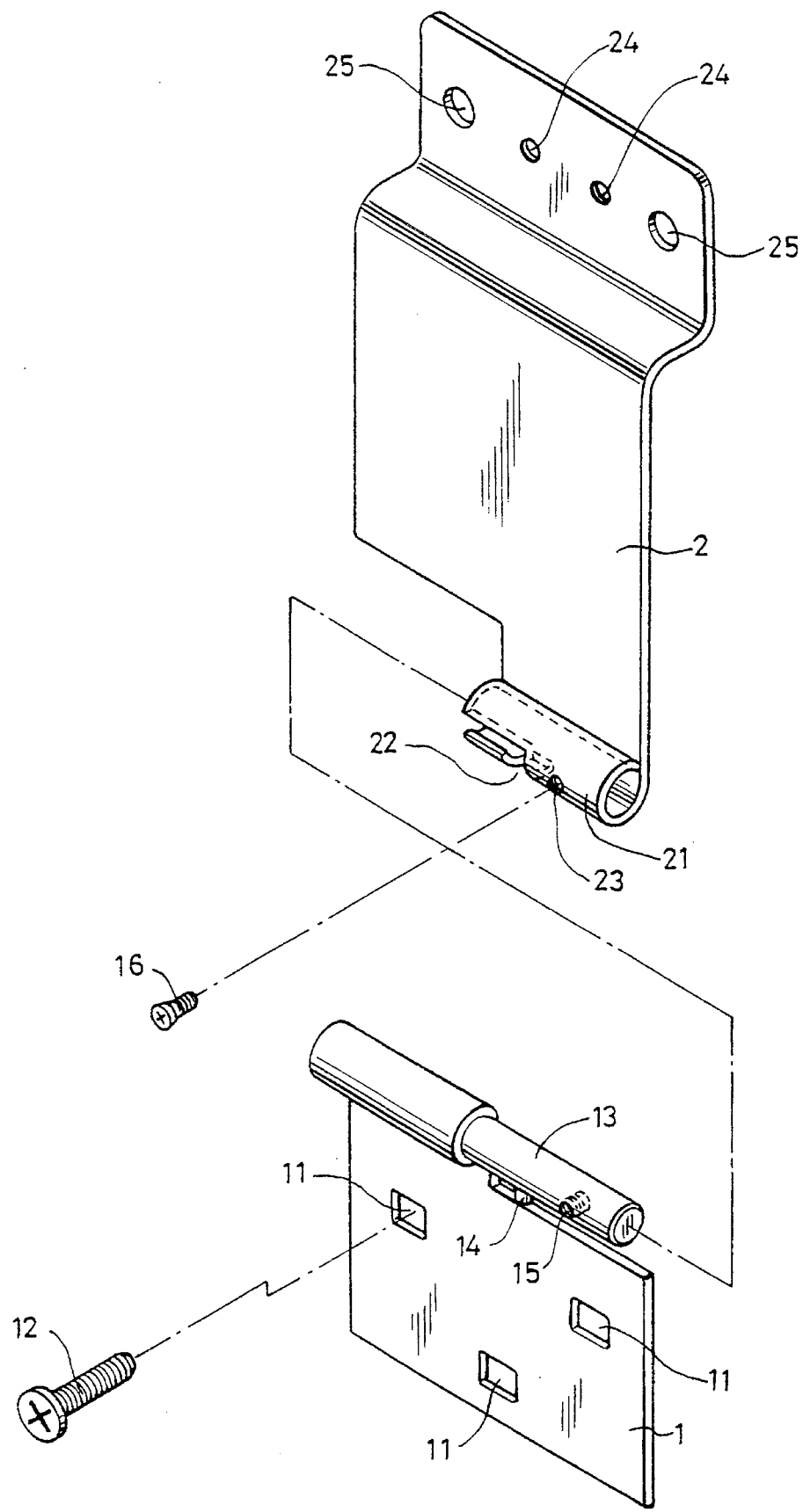
FIG. 1 is an exploded view of an attachment device in accordance with the present invention.

Referring to the drawings, and initially to FIGS. 1 to 3, an attachment device in accordance with the present invention is provided for attaching a gearshift lock to the floor portion of a vehicle. The attachment device comprises a base plate 1 including a number of holes 11 formed therein for engaging with screws 12 so as to secure the base plate 1 to the vehicle. The base plate 1 includes a rod 13 extended laterally on the upper portion thereof. The rod 13 includes a projection 14 extended therefrom and a screw hole 15 formed therein for engaging with screw 16. A bar member 2 includes a sleeve 21 formed in the lower portion for rotatably engaging with the rod 13. The sleeve 21 includes a notch, such as an L-shaped notch 22 formed therein for engaging with the projection 14 of the rod 13, and includes a screw hole 23 formed therein for engaging with the screw 16. The upper portion of the bar member 2 includes two holes 24 for engaging with screws (not shown) which secure the gearshift lock device (not shown) to the bar member 2, and two apertures 25 for engaging with lock shank of the gearshift lock device.

It is to be noted that, without the screw 16, the sleeve 21 can be retained in place relative to the rod 13 by the engagement between the projection 14 and the notch 22, such that the bar member 2 can not be easily disengaged from the base plate 1 and the gearshift lock can not be easily disengaged from the gearshift stick. The screw 16 fixes the bar member 2 to the base plate 1 so as to prevent the bar member 2 from rotating relative to the base plate 1.

Figure 4:
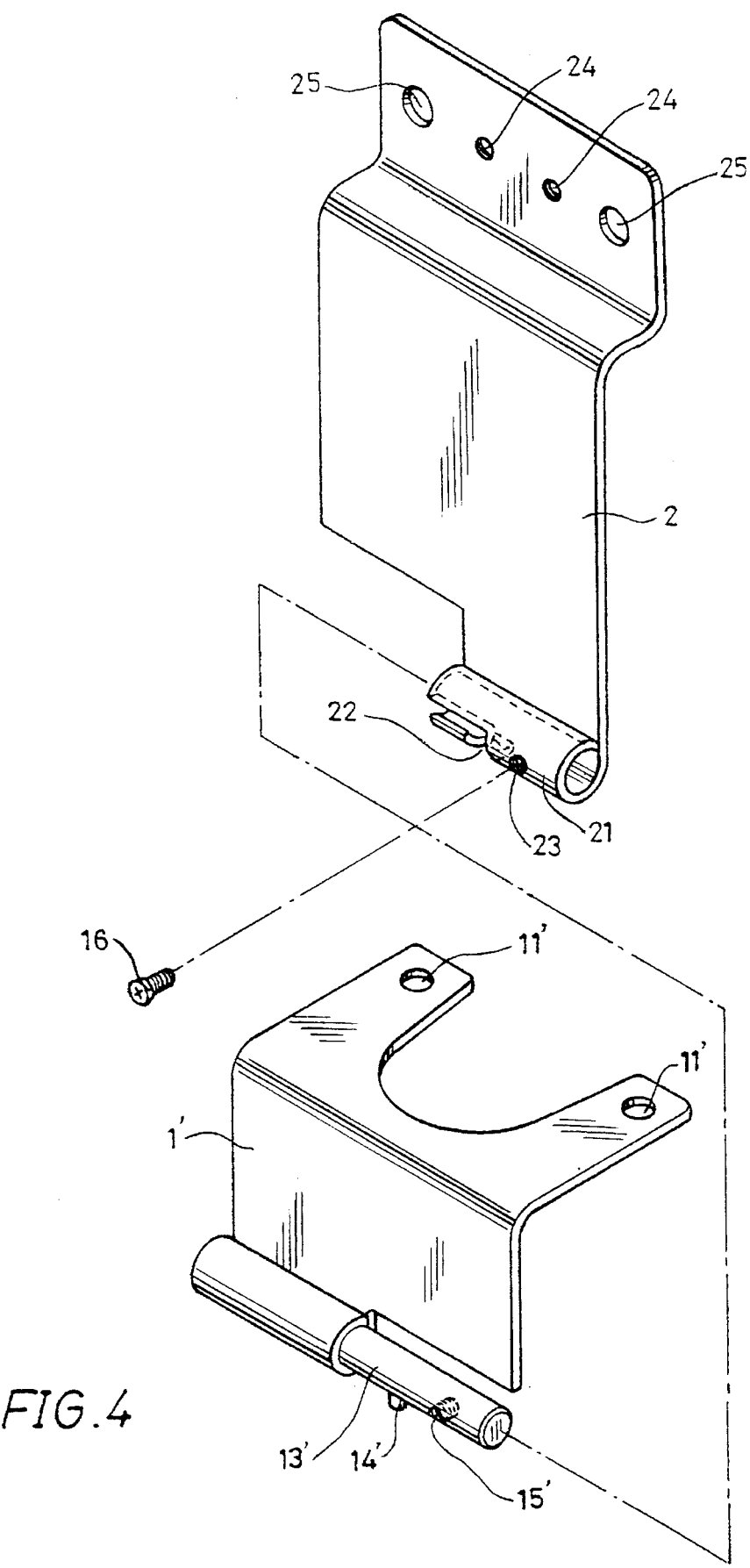
FIG. 4 is an exploded view showing another application of the attachment device.

Referring next to FIG. 4, the base plate 1' may includes a horizontal plate having two holes 11' formed therein for engaging with fastening members so as to secure the base plate 1' to the vehicle. The base plate 1' also includes a rod 13 having a projection 14 and a screw hole 15 formed therein for engaging with the notch 22 and the screw 16 respectively.

Accordingly, the attachment device includes a bar member 2 that can be disengaged from the base plate 1, 1' when required so as to repair the gearshift mechanism. The bar member 2 can be solidly secured to the base plate and can not be easily disengaged from the base plate when the gearshift lock device locks the gearshift stick in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An attachment device for attaching a gearshift lock to a vehicle, said attachment device comprising a base plate fixed to said vehicle, said base plate including a rod provided thereon, said rod including a projection formed thereon, a bar means for supporting said gearshift lock, said bar means including a sleeve formed thereon for rotatably engaging with said rod, said sleeve including a notch formed therein for engaging with said projection, and means for securing said sleeve to said rod so as to prevent said bar means from rotating relative to said base plate.

* * * * *
}